(12) United States Patent
Moriyama

(10) Patent No.: US 11,949,094 B2
(45) Date of Patent: Apr. 2, 2024

(54) METHOD FOR MANUFACTURING ELECTRODE FOR SECONDARY BATTERY, AND MOISTURE POWDER

(71) Applicant: Prime Planet Energy & Solutions, Inc., Tokyo (JP)

(72) Inventor: Satoshi Moriyama, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 11 days.

(21) Appl. No.: 17/706,595

(22) Filed: Mar. 29, 2022

(65) Prior Publication Data

US 2022/0320485 A1 Oct. 6, 2022

(30) Foreign Application Priority Data

Apr. 1, 2021 (JP) ................................ 2021-063000

(51) Int. Cl.
*H01M 4/139* (2010.01)
*H01M 4/04* (2006.01)
*H01M 4/62* (2006.01)

(52) U.S. Cl.
CPC ......... *H01M 4/139* (2013.01); *H01M 4/0404* (2013.01); *H01M 4/043* (2013.01); *H01M 4/625* (2013.01)

(58) Field of Classification Search
CPC .... H01M 4/139; H01M 4/0404; H01M 4/043; H01M 4/625; H01M 2004/027; H01M 4/88; H01M 4/0416; H01M 4/8846
See application file for complete search history.

(56) References Cited

U.S. PATENT DOCUMENTS

| 6,013,393 | A | 1/2000 | Taniuchi et al. | |
|---|---|---|---|---|
| 2015/0072239 | A1 | 3/2015 | Yoshida et al. | |
| 2015/0086850 | A1* | 3/2015 | Yokouchi | H01M 4/485 |
| | | | | 427/126.3 |
| 2018/0076450 | A1 | 3/2018 | Torita et al. | |
| 2021/0074999 | A1* | 3/2021 | Imoto | H01M 4/133 |

FOREIGN PATENT DOCUMENTS

| CN | 105489959 | * | 4/2016 |
|---|---|---|---|
| JP | H07296794 | * | 11/1995 |
| JP | H9-73917 A | | 3/1997 |
| JP | 2010-67365 A | | 3/2010 |

(Continued)

*Primary Examiner* — Tabassom Tadayyon Eslami
(74) *Attorney, Agent, or Firm* — HAUPTMAN HAM, LLP

(57) ABSTRACT

A method for manufacturing an electrode disclosed herein includes a step of granulating a moisture powder formed by aggregated particles including at least an electrode active material, carbon nanotubes, and a non-aqueous electrolytic solution, and a step of forming an electrode by supplying an electrode active material layer composed of the moisture powder onto the electrode current collector. The granulation step includes a first mixing treatment of mixing the carbon nanotubes and the non-aqueous electrolytic solution to impregnate the carbon nanotubes with the non-aqueous electrolytic solution, a second mixing treatment of mixing the carbon nanotubes impregnated with the non-aqueous electrolytic solution and the electrode active material, and a treatment of compressing the mixture obtained by the first and second mixing treatments.

8 Claims, 4 Drawing Sheets

(56) References Cited

FOREIGN PATENT DOCUMENTS

| | | | |
|---|---|---|---|
| JP | 2012-204333 | * | 10/2012 |
| JP | 2015-56252 | A | 3/2015 |
| JP | 2017-117582 | * | 7/2015 |
| JP | 2015521783 | A | 7/2015 |
| JP | 2017-98029 | A | 6/2017 |
| JP | 2017117582 | A | 6/2017 |
| JP | 2017533548 | A | 11/2017 |
| JP | 2018-45815 | A | 3/2018 |
| JP | 2018113113 | A | 7/2018 |
| JP | 2021-15776 | A | 2/2021 |
| WO | 2013188265 | A1 | 12/2013 |
| WO | 2016073575 | A1 | 5/2016 |
| WO | 2021/200581 | A1 | 10/2021 |

* cited by examiner

METHOD FOR MANUFACTURING ELECTRODE FOR SECONDARY BATTERY, AND MOISTURE POWDER

CROSS REFERENCE TO RELATED APPLICATIONS

The present application claims priority from Japanese Patent Application No. 2021-063000 filed on Apr. 1, 2021, which is incorporated by reference herein in its entirety.

BACKGROUND OF THE DISCLOSURE

1. Technical Field

The present disclosure relates to a method for manufacturing an electrode for a secondary battery and to a moisture powder.

2. Description of Background

Since secondary batteries such as lithium ion secondary batteries are lighter and have a higher energy density than conventional batteries, the secondary batteries are preferably used as high-output power sources for mounting on vehicles or as power sources for personal computers and mobile terminals. In particular, lithium ion secondary batteries are preferably used as high-output power sources for driving vehicles such as battery electric vehicles (BEVs), hybrid electric vehicles (HEVs), and plug-in hybrid electric vehicles (PHEVs).

In a typical structure of positive and negative electrodes (hereinafter, simply referred to as "electrode" when the positive and negative electrodes are not specifically distinguished) provided in this type of secondary battery, an electrode active material layer including an electrode active material as a main component is formed on one or both sides of a foil-shaped electrode current collector. Such electrode active material layer is formed by dispersing solid components such as an electrode active material, a binding material (binder), and a conductive material in a predetermined solvent to prepare a slurry (paste)-like electrode material, coating the electrode material on the surface of an electrode current collector to form a coating film, drying the coating film, and then applying a pressing pressure to obtain predetermined density and thickness. Alternatively, instead of forming a film with such a mixed material slurry, moisture powder sheeting (MPS) is also being investigated in which a film is formed using a so-called moisture powder in which a proportion of solid components is relatively higher than that of the mixed material slurry and granular aggregates are formed in a state where a solvent is held on the surface of active material particles and the surface of binder molecules. For example, Japanese Patent Application Publications No. 2018-113113 and Japanese Patent Application Publications No. 2017-117582 describe a method for forming an active material layer with a moisture powder.

Japanese Patent Application Publications No. 2018-113113 discloses a method for moisture powder sheeting in which in order to form an electrode active material layer having a uniform thickness on a current collector foil, a mixed solution of a solvent and a surfactant is used and a contact angle of the electrode active material is adjusted. Further, Japanese Patent Application Publications No. 2017-117582 discloses a method for manufacturing a secondary battery including a step of preparing a granulated product including a part of a solvent component of an electrolytic solution in order to improve the spreadability of the granulated product while suppressing deterioration of battery performance.

SUMMARY

However, from the viewpoint of improving the electrode density, it is preferable that the non-conductive binder resin which can be a resistance component be not included if possible. Further, as described in Japanese Patent Application Publications No. 2017-117582, when the solvent conventionally used for producing this type of non-aqueous electrolyte secondary battery remains in the electrode and is brought into the battery, the battery performance may deteriorate. Therefore, it is necessary to carry out a drying step in order to remove the solvent and to provide an apparatus for recovering the solvent, which increases the production cost. For this reason, from the viewpoint of improving battery performance and productivity, it is preferable that the amount of the non-conductive binder resin and solvent, which have been conventionally suitably used for manufacturing non-aqueous electrolyte secondary batteries, be as small as possible (in other words, that the binder resin and solvent be substantially not included).

The present disclosure has been created in view of such circumstances, and a main object thereof is to provide a method for manufacturing an electrode having an improved electrode density at a low production cost. Another object is to provide a moisture powder enabling suitable manufacture of such an electrode.

A method for manufacturing an electrode herein is provided to achieve above object. The manufacturing method disclosed herein is for manufacturing an electrode having either positive or negative electrode current collector and an electrode active material layer, the method comprising: a step of granulating a moisture powder formed by aggregated particles including at least an electrode active material, carbon nanotubes, and a non-aqueous electrolytic solution, and a step of forming an electrode by supplying an electrode active material layer composed of the moisture powder onto the electrode current collector. The granulation step includes a first mixing treatment of mixing the carbon nanotubes and the non-aqueous electrolytic solution to impregnate the carbon nanotubes with the non-aqueous electrolytic solution, a second mixing treatment of mixing the carbon nanotubes impregnated with the non-aqueous electrolytic solution and the electrode active material, and a treatment of compressing the mixture obtained by the first and second mixing treatments.

By impregnating the carbon nanotubes with the non-aqueous electrolytic solution in the first mixing treatment and then mixing with the electrode active material in the second mixing treatment as described above, it is possible to adhere the non-aqueous electrolytic solution preferentially to the surface of the electrode active material. The particles of the electrode active material having the non-aqueous electrolytic solution adhered to the surface are granulated as moisture powder in a state of being suitably bonded by a liquid crosslinking force. By using the moisture powder in such a state, the electrode active material layer can be formed on the electrode current collector even when the binder resin and the solvent are substantially not included. Since the moisture powder does not use a non-conductive binder resin used in the conventional method for manufacturing a secondary battery or a solvent that may adversely affect the battery performance, the electrode density is improved and a configuration that does not require a drying step for removing the solvent or a solvent recovery device is obtained. Therefore, with such a configuration, it is possible to manufacture an electrode having an improved electrode density at a low production cost.

In a preferred embodiment of the manufacturing method disclosed herein, in the moisture powder granulated in the granulation step, a solid phase and a liquid phase form a capillary state in the aggregated particle, and a solid content ratio is 70% by mass or more when the total amount of the moisture powder is 100% by mass.

Since in the moisture powder, the solid phase and the liquid phase form a capillary state described hereinbelow in the aggregated particles constituting the moisture powder, the electrode active material layer can be more suitably formed on the electrode current collector. In order to suitably form such a capillary state, the solid content of the moisture powder is preferably 70% by mass or more. With such a configuration, the electrode active material layer can be formed even when the binder resin is substantially not included.

In a preferred embodiment of the manufacturing method disclosed herein, an oil absorption amount of the carbon nanotubes is 280 mL/100 g or more and 1000 mL/100 g or less.

With such a configuration, by using the carbon nanotubes having a certain amount of oil absorption, the carbon nanotubes can be more suitably impregnated with the non-aqueous electrolytic solution in the first mixing treatment. As a result, in the granulation step, it is possible to granulate a moisture powder in which the liquid crosslinking force is sufficiently exhibited.

In a preferred embodiment of the manufacturing method disclosed herein, in the electrode formation step, the electrode is formed by adhering the moisture powder supplied between a first roll and a second roll disposed opposite to the first roll as the electrode active material layer onto the outer peripheral surface of the second roll, and transferring the electrode active material layer from the outer peripheral surface of the second roll to the surface of the electrode current collector separately supplied to the second roll.

With such a configuration, the electrode active material layer composed of moisture powder can be more efficiently formed on the electrode current collector.

The moisture powder disclosed herein is provided to achieve the above other object. The moisture powder disclosed herein is for forming an electrode active material layer on either a positive or negative electrode current collector and is configured of aggregated particles including an electrode active material, carbon nanotubes, and a non-aqueous electrolytic solution. When the total amount of the moisture powder is 100% by mass, the solid content ratio is 70% by mass or more. In the aggregated particle, the solid phase and the liquid phase form a capillary state. The oil absorption amount of the carbon nanotubes is 280 mL/100 g or more and 1000 mL/100 g or less.

With such a configuration, it is possible to provide a moisture powder enabling suitable manufacture of an electrode having an improved electrode density.

BRIEF DESCRIPTION OF THE DRAWINGS

FIG. 3A shows a pendular state, FIG. 3B shows a funicular state, FIG. 3C shows a capillary state, and FIG. 3D shows a slurry state;

DETAILED DESCRIPTION

Hereinafter, a method for manufacturing an electrode and a moisture powder enabling suitable manufacture of the electrode, which are disclosed herein, will be described in detail by taking an electrode that can be suitably used for a lithium ion secondary battery, which is a typical example of a secondary battery, as an example.

Matters other than those specifically mentioned in this specification and necessary for implementation can be ascertained as design matters for those skilled in the art based on the related art in the pertinent field. The contents of the technique disclosed herein can be implemented based on the contents disclosed in the present description and common technical knowledge in the art.

Also, the dimensional relationship (length, width, height, and the like) does not reflect the actual dimensional relationship.

In this description, the notation of "A to B (where, A and B are arbitrary values)" indicating the range means A or more and B or less.

As used herein, the term "secondary battery" refers to a battery that can be recharged repeatedly. Further, the term "non-aqueous electrolyte secondary battery" refers to a battery provided with a non-aqueous electrolytic solution (typically, a non-aqueous electrolytic solution including a support electrolyte in a non-aqueous solvent). The term "lithium ion secondary battery" refers to a secondary battery that uses lithium ions as a charge carrier and realizes charge/discharge by the transfer of charges by the lithium ions between the positive and negative electrodes. Further, in the present description, when it is not necessary to particularly distinguish between the positive electrode and the negative electrode, it is simply described as an electrode.

Figure 1:
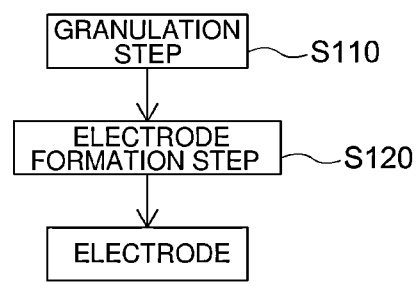
FIG. 1 is a flowchart showing main steps of an electrode manufacturing method according to an embodiment.

FIG. 1 is a flowchart showing a method for manufacturing a non-aqueous electrolyte secondary battery disclosed herein. The method for manufacturing an electrode disclosed herein includes a step (S110) of granulating a moisture powder formed by aggregated particles including at least an electrode active material, carbon nanotubes, and a non-aqueous electrolytic solution, and a step (S120) of forming an electrode by supplying an electrode active material layer composed of the moisture powder onto the electrode current collector. Hereinafter, each step will be described in detail.

Granulation Step

Figure 2:
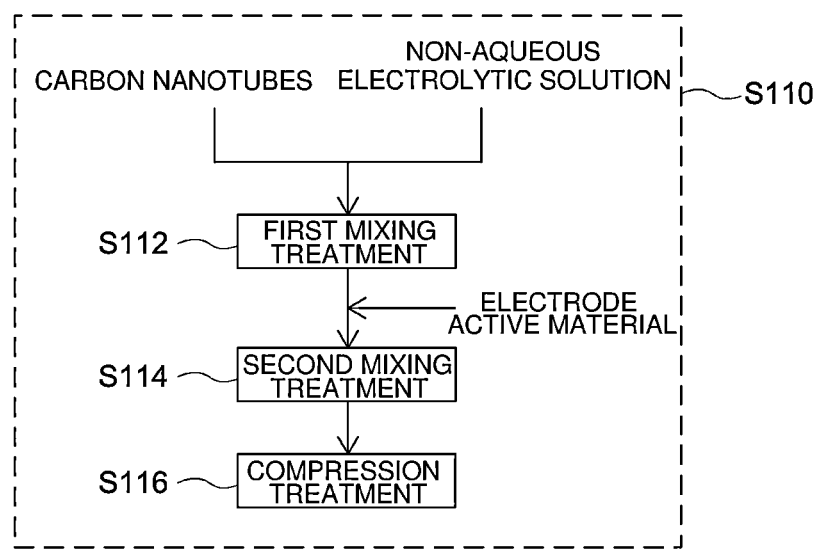
FIG. 2 is a flowchart showing a granulation step according to an embodiment.

As shown in FIG. 2, the granulation step S110 includes a first mixing treatment (S112) of mixing the carbon nanotubes and the non-aqueous electrolytic solution, a second mixing treatment (S114) of further adding an electrode active material and mixing after the first mixing treatment, and a compression treatment (S116) of compressing the mixture obtained by the first and second mixing treatments.

The moisture powder granulated by the manufacturing method disclosed herein is typically composed of aggregated particles including an electrode active material, carbon nanotubes, and a non-aqueous electrolytic solution. The moisture powder is in the form of powder as a whole and has no free liquid surface at a gas-liquid interface. As a configuration exhibiting such properties, for example, it is preferable that the aggregated particles constituting the moisture powder form a capillary state described hereinbelow. As a result of the moisture powder forming the capillary state, the moisture powder particles can be stretched while being integrated with each other to form suitably a film-like electrode active material layer.

The morphological classification of such moisture powders is described in "Particle Size Enlargement" by Capes C. E. (Elsevier Scientific Publishing Company, 1980), the four currently known classifications are used in the present description, and the moisture powder disclosed herein is clearly defined. Specifically, as described hereinbelow.

The presence form (filling state) of a solid phase (solid component such as an electrode active material), a liquid phase (liquid component such as a non-aqueous electrolytic solution) and a gas phase (voids) in an aggregated particle constituting the moisture powder can be classified into four following states: "pendular state", "funicular state", "capillary state", and "slurry state".

Figure 3A:
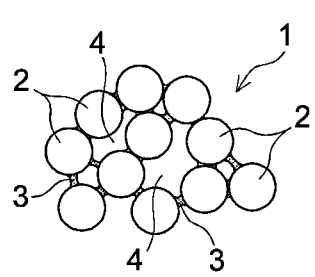
FIGS. 3A to 3D are explanatory drawings schematically showing the presence forms of a solid phase (solid component such as active material particles), a liquid phase (solvent), and a gas phase (voids) in the aggregated particles constituting the moisture powder.

In the "pendular state", as shown in FIG. 3A, a liquid component (liquid phase) 3 is discontinuously present so as to crosslink between the solid components (solid phases) 2 in the aggregated particle 1, and the solid components 2 can be present in a connected (continuous) state with each other. As shown in the figure, the content ratio of the liquid component 3 is relatively low, and as a result, most of the voids (gas phase) 4 present in the aggregated particle 1 are present continuously and form communication holes leading to the outside.

Figure 3B:
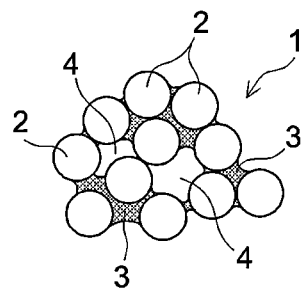

In the "funicular state", as shown in FIG. 3B, the content ratio of the liquid component 3 in the aggregated particle 1 is relatively higher than in the pendular state, and the liquid component 3 is continuously present around the solid components 2 in the aggregated particle 1. However, since the amount of the liquid component 3 is still small, the solid components 2 are present a state of being connected (continuous) to each other as in the pendular state. Among the voids 4 present in the aggregated particle 1, the proportion of the communicating holes leading to the outside tends to decrease slightly, and the presence proportion of the discontinuous isolated voids tends to increase, but the presence of the communicating holes is recognized.

Figure 3C:
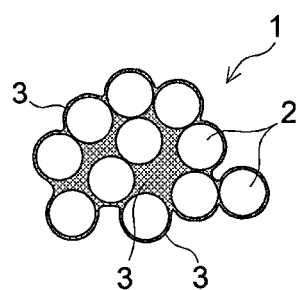

In the "capillary state", as shown in FIG. 3C, the content ratio of the liquid component 3 in the aggregated particle 1 increases, the amount of the liquid component 3 in the aggregated particle 1 becomes close to the saturated state, and a sufficient amount of the liquid component 3 is continuously present around the solid components 2. As a result, the solid components 2 are present in a discontinuous state. The space between the solid components is filled with the liquid component 3, and the bonding force between the solid components is strong. The liquid component 3 stays on the surface of the aggregated particle 1, and the surface of the aggregated particle 1 is in a moist state and can exhibit viscosity. Due to the increase in the content of the liquid component 3 in the aggregated particle 1, almost no voids are present, and when voids are present, almost all voids (for example, 80% by volume or more of the total void volume) are present as isolated voids.

Figure 3D:
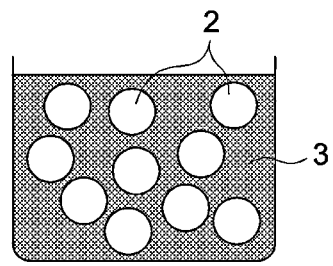

As shown in FIG. 3D, the "slurry state" is a state in which the solid component 2 is no longer suspended in the liquid component 3, and this state cannot be called aggregated particles. The gas phase is absent to a larger degree than in the capillary state.

The moisture powder may have any solid content ratio as long as the moisture powder suitably realizes the capillary state, and the solid content ratio is typically 70% by mass or more when the total amount of the moisture powder is 100% by mass. Since a certain amount of the liquid component 3 is required for the moisture powder to form a suitable capillary state, the solid content ratio may be 87% by mass or less, 85% by mass or less, and 83% by mass % or less.

In the present description, the "solid content ratio" means the proportion of solid components in the entire moisture powder.

As the electrode active material which is the main component of the solid component 2, a compound having a composition that can be utilized as a negative electrode active material or a positive electrode active material of a conventional secondary battery (here, a lithium ion secondary battery) can be used. Examples of the negative electrode active material include carbon materials such as graphite, hard carbon, soft carbon, and the like. Further, other examples of the negative electrode active material include metal materials consisting of a metal such as tin (Sn), aluminum (Al), zinc (Zn), silicon (Si), or the like or an alloy mainly composed of these metals (so-called alloy system), or the like. Examples of the positive electrode active material include lithium transition metal composite oxides such as $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like and lithium transition metal phosphate compounds such as $LiFePO_4$ and the like. The average particle diameter of the electrode active material is not particularly limited, but is suitably about 0.1 μm to 50 μm, and preferably about 1 μm to 20 μm.

In the present description, the "average particle diameter" refers to a particle diameter ($D_{50}$, also referred to as a median diameter) corresponding to a cumulative frequency of 50% by volume from the fine particle side having a small particle diameter in a volume-based particle size distribution determined based on a general laser diffraction/light scattering method.

The oil absorption amount of carbon nanotubes contained in the moisture powder is required to be 280 mL/100 g or more and 1000 mL/100 g or less. By using carbon nanotubes having an oil absorption amount in such a range, the non-aqueous electrolyte solution can be suitably held in the first mixing treatment S112 described hereinbelow, and the non-aqueous electrolyte solution is preferentially applied to the surface of the electrode active material when mixed with the electrode active material in the second mixing treatment S114.

The oil absorption amount of carbon nanotubes can be measured according to the method described in JIS K6217-4:2008 using dibutyl phthalate (DBP) as the reagent liquid.

The carbon nanotube may be a single-walled carbon nanotube (SWNT) composed of one cylindrical graphene sheet, a double-walled carbon nanotube (DWNT) in which two different SWNTs are nested, or a multi-walled carbon nanotube (MWNT) in which three or more different SWNTs are nested. From the viewpoint of suitably satisfying the oil absorption amount, carbon nanotubes having two or more layers (DWNT, MWNT) are preferable. These can be used alone or in combination of two or more. The carbon nanotubes may be manufactured by an arc discharge method, a laser ablation method, a chemical vapor deposition method, or the like.

The average length of the carbon nanotubes is not particularly limited as long as the above-described oil absorption amount is ensured, but a constant average length can contribute to the bond between the particles of the electrode active material and the improvement of conductive path. The average length of the carbon nanotubes is, for example, preferably 5 µm or more, and may be 8 µm or more, or 10 µm or more. Where the average length is too long, the carbon nanotubes may be over-aggregated during mixing. The average length of the carbon nanotubes may be typically 150 µm or less, for example 120 µm or less. By using carbon nanotubes having an average length in such a range, the carbon nanotubes can be appropriately entangled with the electrode active material, and the bonding and conductive path between the particles of the electrode active material can be suitably ensured.

The average diameter of the carbon nanotubes is not particularly limited, and may be, for example, 2 nm or more and 150 nm or less, and may be 5 nm or more and 120 nm or less. For the average length and average diameter of the carbon nanotubes, for example, values obtained by measurement based on electron microscope observation can be adopted.

The aspect ratio (average length/average diameter) of carbon nanotubes is typically 100 or more. A larger aspect ratio of the carbon nanotubes facilitates entangling, so that the functions as a binder and a conductive material can be fully exhibited between the electrode active material particles. The aspect ratio may be 250 or more, 500 or more, and 800 or more. From the viewpoint of dispersibility in the granulation step, it is appropriate that the aspect ratio be approximately 25,000 or less, preferably 20,000 or less, and more preferably 15,000 or less.

As the non-aqueous electrolyte solution used for the moisture powder, the same as in the secondary battery of this type can be conventionally used, and typically, a non-aqueous electrolyte solution in which a support electrolyte (also referred to as a support salt) is contained in a non-aqueous solvent can be used. As the non-aqueous solvent, non-aqueous solvents such as carbonates, esters, ethers, nitriles, sulfones, lactones and the like can be used without particular limitation. Specifically, for example, non-aqueous solvents such as ethylene carbonate (EC), diethyl carbonate (DEC), dimethyl carbonate (DMC), ethylmethyl carbonate (EMC), monofluoroethylene carbonate (MFEC), difluoroethylene carbonate (DFEC), monofluoromethyl, difluoromethyl carbonate (F-DMC), trifluorodimethyl carbonate (TFDMC) and the like can be preferably used. One kind of such non-aqueous solvents may be used alone, or two or more kinds may be used in combination as appropriate.

As the support salt contained in the non-aqueous solvent, the support salt used in the conventional non-aqueous electrolyte secondary battery of this type can be used without particular limitation. For example, lithium salts such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, and the like can be used.

Although not particularly limited, in the manufacturing method disclosed herein, the support salt concentration in the non-aqueous electrolyte solution in the granulation step S110 may be set higher than in the conventional methods. For example, the support salt concentration may be 2 mol/L or more and 5 mol/L or less, and may be 2.5 mol/L or more and 4.5 mol/L or less. For example, in the non-aqueous electrolyte solution injection step which has been generally performed in this type of production method, the support salt concentration may be adjusted, as appropriate, so that the concentration of the support salt of the non-aqueous electrolytic solution in the constructed non-aqueous electrolyte solution secondary battery is approximately 1 mol/L (for example, 0.7 mol/L or more and 1.3 mol/L or less).

The non-aqueous electrolytic solution of the non-aqueous secondary battery according to the present embodiment may include various additives, for example, a gas generator such as biphenyl (BP), cyclohexylbenzene (CHB), or the like, a film forming agent, a dispersant a thickener, or the like as long as the effect of the present disclosure is not significantly impaired.

From the viewpoint of energy density, the proportion of the electrode active material in the total solid content of the moisture powder may be approximately 70% by mass to 99.5% by mass, and typically 80% by mass to 99% by mass, for example, 85% by mass to 95% by mass. The proportion of the carbon nanotubes in the total solid content of the moisture powder may be typically 0.5% by mass to 20% by mass, for example, 1% by mass to 10% by mass. In addition, the moisture powder may include materials (for example, various additives and the like) other than those described above as long as the effects of the present disclosure are not impaired. When various additives are included, the proportion of the additives to the total solid content of the moisture powder is preferably 7% by mass or less, and more preferably 5% by mass or less. The moisture powder does not contain a liquid dispersion medium capable of dispersing the powdery material and increasing the flowability.

As shown in FIG. 2, the granulation step disclosed herein includes the first mixing treatment S112 of mixing the carbon nanotubes and the non-aqueous electrolytic solution, the second mixing treatment S114 of mixing the mixture of the electrolytic solution and the carbon nanotubes with the electrode active material, and compression treatment S116 of compressing the mixture obtained by the first and second mixing treatments. As the mixing method, a conventionally known method may be used. Examples of methods for producing granulated particles include granulation methods such as a rolling granulation method, a fluidized bed granulation method, a stirring granulation method, a compression granulation method, an extrusion granulation method, a crushing granulation method, a spray-drying method, and the like. Among them, the compression granulation method is preferable because the moisture powder disclosed herein can be suitably granulated.

In the first mixing treatment S112, the carbon nanotubes and the non-aqueous electrolytic solution are mixed using a conventionally known mixing device. As such a mixing device, a mixer such as a planetary mixer may be used for mixing. Such a mixer is typically provided with a cylindrical mixing vessel, a rotary vane accommodated inside the mixing vessel, and a motor connected to the rotary vane by a rotary shaft.

The carbon nanotubes and the non-aqueous electrolytic solution are placed into the mixing vessel of the mixer and mixed so that the carbon nanotubes are sufficiently impregnated with the non-aqueous electrolytic solution. The mixing time of the first mixing treatment may vary depending on the device configuration and the like, but is usually about 1 sec to 60 sec (for example, 2 sec to 40 sec). The rotation speed may be, for example, about 2000 rpm to 5000 rpm. By mixing under such mixing conditions, the carbon nanotubes are appropriately aggregated, and a mixture in which the non-aqueous electrolytic solution is retained can be obtained.

The non-aqueous electrolytic solution is weighed and charged so that the solid content ratio of the moisture powder is 70% by mass or more. In the moisture powder disclosed herein, the solid content ratio is set to a relatively high value as compared with the conventional slurry-like composition. By setting the solid content ratio to a relatively high value, the electrode active material, the carbon nanotubes, and the non-aqueous electrolytic solution can be suitably integrated and granulated into the capillary state. Where the granulated particles are in such a capillary state, the adhesion between the granulated particles is likely to improve in the electrode formation step S120, and a film can be suitably formed.

In the second mixing treatment S114, the carbon nanotubes impregnated with the non-aqueous electrolytic solution, which were obtained by the first mixing treatment S112, are mixed with the electrode active material. As the electrode active material, the entire prepared active material may be added at once, or the active material may be added by small amounts. The first mixing treatment S112 and the second mixing treatment S114 may be performed using the same mixing device or different mixing devices, but from the viewpoint of productivity, the same mixing device is preferably used. For example, the electrode active material may be further added to the mixing vessel of the mixer used in the first mixing treatment S112 and mixed therein. The mixing time of the second mixing treatment S114 is preferably set shorter than the mixing time of the first mixing treatment S112. For example, the mixing time of the second mixing treatment may be about 1 sec to 30 sec. Further, the rotation speed of the second mixing treatment S114 may be smaller than the rotation speed of the first mixing treatment, and may be, for example, about 100 rpm to 1000 rpm.

In the compression treatment S116, the mixture obtained by the first and second mixing treatments is granulated while being compressed using a conventionally known granulator. For example, a preferred embodiment of such a granulator is a roll mill that granulates while compressing a mixture put between a pair of rolls that rotate in opposite directions.

In compression granulation by a roll mill, granulation is performed while applying a high compressive force and a shearing force to the charged mixture (the carbon nanotubes impregnated with the non-aqueous electrolyte, and the electrode active material). Although not particularly limited, it is presumed that the following granulation is performed by such a granulation method to suitably form a moisture powder in a capillary state.

The carbon nanotubes impregnated with the non-aqueous electrolyte, and the electrode active material are rubbed against each other while being compressed, so that aggregated particles are formed while the impregnated non-aqueous electrolyte is pushed out from the carbon nanotubes and preferentially adheres to the surface of the electrode active material. Further, the gas is pushed out from the mixture, the gaps between the electrode active material particles become small, and the density of the active materials becomes high. That is, the solid component 2 (here, the electrode active material) and the liquid component 3 (here, the non-aqueous electrolytic solution) can form the aggregated particle 1 in the capillary state as shown in FIG. 3C. The carbon nanotubes from which the non-aqueous electrolytic solution has been pushed out are entrained in the aggregated particles formed while being crushed by a high compressive force, and the carbon nanotubes adhere to the surface of the aggregated particles.

According to the findings of the present inventor, when the electrode active material, carbon nanotubes, and non-aqueous electrolytic solution are all mixed at the same time and then granulated by the compression granulation method, the binding strength of the granulated material (moisture powder) is low. The following reason why such an effect is obtained can be presumed, but it is not intended to limit the technique disclosed herein. For example, when all the materials are charged and mixed at the same time, each component can be uniformly dispersed. In this case, it is presumed that the non-aqueous electrolytic solution is not preferentially arranged on the surface of the electrode active material, and the liquid crosslinking force (a sum of capillary negative pressure and surface tension) between the particles of the electrode active material becomes small.

Figure 4:
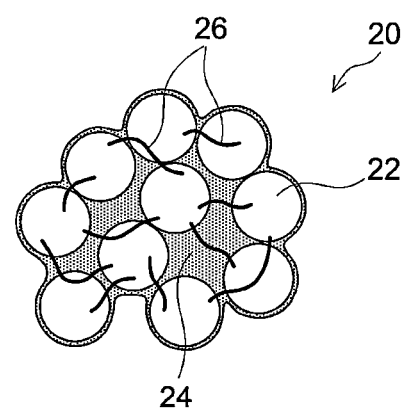
FIG. 4 is an explanatory diagram schematically showing the moisture powder obtained in the granulation step according to an embodiment.

FIG. 4 schematically shows an example of a moisture powder 20 formed in the granulation step S110. As shown in FIG. 4, the moisture powder 20 disclosed herein includes at least a plurality of particles of an electrode active materials 22, a non-aqueous electrolytic solution 24, and carbon nanotubes 26. In a preferred embodiment, in an aggregated particle constituting the moisture powder 20, a solid phase and a liquid phase form the above-mentioned capillary state, and a sufficient amount of the non-aqueous electrolytic solution 24 is continuously present around the electrode active material 22. As a result, the electrode active material 22 is present in a discontinuous state. The carbon nanotubes 26 are adhered to the surface of the aggregated particle. Although not particularly limited, it is preferable that the carbon nanotubes 26 be unevenly distributed around the electrode active material 22 rather than uniformly dispersed in the moisture powder 20. As a result, the carbon nanotube 26 can contribute to the bonding between the particles of the electrode active material 22 and the improvement of the conductive path between the particles of the active material.

The moisture powder 20 granulated in the granulation step S110 of the manufacturing method disclosed herein includes substantially no binder resin conventionally used in this type of electrode manufacturing method. The binder resin referred to herein is a resin that acts as a binder and does not have conductivity. Examples thereof include rubbers such as a styrene-butadiene copolymer (SBR), an acrylic acid-modified SBR resin (SBR-based latex) and the like, cellulous polymers such as carboxymethyl cellulose (CMC) and the like, acrylic resins such as polymers of methacrylic acid esters and the like, polyvinylidene fluoride (PVdF), and the like.

In this description, "substantially not included" means that the target component is not intentionally added, and the component is not contained at all, or that the target component is contained only in a very small amount (so-called contamination level) that is meaningless in the manufacturing method disclosed herein.

In the conventional method for manufacturing moisture powder, the moisture powder is granulated by the stirring granulation method in which solid components (for example, electrode active material, binder resin, conductive material, and the like) are mixed in advance by a dry mixing method and a small amount of solvent (liquid component) is added to perform further mixing. In the stirring granulation method, the solid components collide with each other while irregularly rolling due to the rotation of a blade and are granulated as lumps (granulated bodies) while gradually aggregating. At this time, the binder resin contained in the solid component acts to bind the aggregated solid components to each other. Therefore, in the stirring granulation method, the binder resin is an indispensable component. However, since the binder resin can generally be a resistance component in the constructed electrode, it is preferable that the amount of the binder resin be as small as possible (in other words, that the binder resin be substantially not included).

By contrast, in the granulation step S110 disclosed herein, first, the carbon nanotubes 26 having the above-mentioned characteristics are impregnated with the non-aqueous electrolytic solution 24 by the first mixing treatment S112 in which the carbon nanotubes 26 and the non-aqueous electrolytic solution 24 are mixed. After that, the carbon nanotubes 26 impregnated with the non-aqueous electrolytic solution 24 are mixed with the electrode active material 22 by the second mixing treatment S114. In the compression treatment S116 in which the mixture obtained by the first mixing treatment S112 and the second mixing treatment S114 is compressed, the non-aqueous electrolytic solution 24 is preferentially arranged on the surface of the electrode active material 22, and the aggregated particles in the capillary state are suitably formed. Furthermore, since the carbon nanotubes 26 appropriately crushed by the compression are further arranged on the surface of the aggregated particles, the moisture powder 20 having improved bonding force and conductive path between the particles of the electrode active material 22 is formed. As a result, the moisture powder 20 can be granulated even when the binder resin that can be a resistance component is substantially not included.

Further, the moisture powder 20 granulated by the granulation step S110 disclosed herein includes substantially no solvent conventionally used in this type of electrode manufacturing method. The solvent referred to herein is a liquid component that may adversely affect battery performance in a constructed secondary battery. As an example, N-methyl-2-pyrrolidone (NMP), an aqueous solvent (water or a mixed solvent mainly composed of water) and the like can be mentioned. Such a solvent has been used as an essential component in the conventional manufacturing method for the purpose of suitably dispersing an active material, a conductive material, or the like. However, where the solvent remains in a constructed electrode, the battery performance may be adversely affected, so it is necessary to remove the solvent by drying or the like. By contrast, in the moisture powder disclosed herein, a non-aqueous electrolytic solution is used that includes substantially no conventional solvent and does not adversely affect battery performance of the constructed secondary battery. Therefore, it is not necessary to provide a solvent removal step or a solvent recovery device, and the production cost can be suppressed.

The average particle diameter of the moisture powder 20 granulated in the granulation step S110 may be approximately 10 μm or more, 100 μm or more, or 1 mm or more. The upper limit of the average particle diameter is not particularly limited, but is typically 10 mm or less, and may be, for example, 5 mm or less.

Electrode Formation Step

Figure 5:
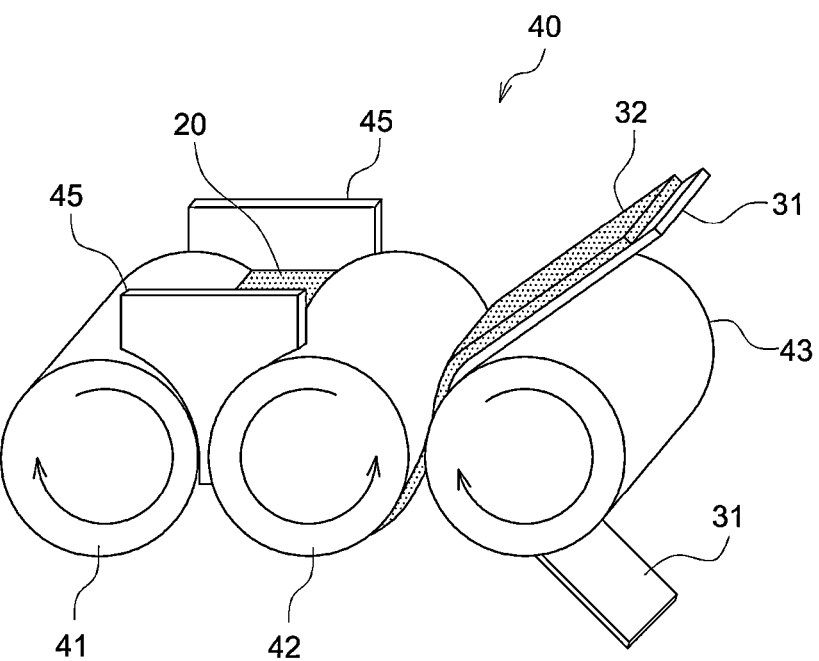
FIG. 5 is an explanatory diagram schematically showing a configuration of a roll film forming apparatus according to an embodiment.

In the electrode formation step S120, an electrode is formed by using the moisture powder granulated in the granulation step S110 to supply an electrode active material layer composed of the moisture powder onto an electrode current collector. An electrode active material layer 32 composed of the moisture powder 20 can be formed by using a roll film forming apparatus 40 such as schematically shown in FIG. 5. As shown in the figure, the roll film forming apparatus 40 is provided with a first rotating roll 41 (hereinafter, also referred to as "supply roll 41") and a second rotating roll 42 (hereinafter, also referred to as a "transfer roll 42") arranged so as to face the first rotating roll 41. The outer peripheral surface of the supply roll 41 and the outer peripheral surface of the transfer roll 42 face each other, and the pair of rotating rolls 41 and 42 can rotate in opposite directions as shown by the arrows in FIG. 5. Further, the supply roll 41 and the transfer roll 42 are separated from each other by a gap corresponding to a desired thickness of the electrode active material layer 32 to be formed on a long sheet-shaped electrode current collector 31. In addition, by adjusting the size of the gap, it is also possible to adjust the force for compressing the moisture powder 20 passing between the supply roll 41 and the transfer roll 42. Therefore, by adjusting the size of the gap between the supply roll 41 and the transfer roll 42 according to the solid content ratio or the like of the moisture powder 20, the granulated particles are suitably integrated with each other and stretched to mold a film.

As the electrode current collector 31, a metal electrode current collector used as an electrode current collector of this type of secondary battery can be used without particular limitation. When the electrode current collector 31 is a positive electrode current collector, it is configured of, for example, a metal material such as aluminum, nickel, titanium, stainless steel, or the like having good conductivity. In particular, aluminum (for example, aluminum foil) is preferable. When the electrode current collector 31 is a negative electrode current collector, it is configured of, for example, a metal material such as copper, an alloy mainly composed of copper, nickel, titanium, stainless steel, or the like having good conductivity. In particular, copper (for example, copper foil) is preferable. The thickness of the electrode current collector 31 is, for example, approximately 5 μm to 20 μm, and preferably 8 μm to 15 μm.

Partition walls 45 are provided at both ends of the supply roll 41 and the transfer roll 42 in the width direction. The partition walls 45 serve to hold the moisture powder 20 on the supply roll 41 and the transfer roll 42 and to define the width of the electrode active material layer 32 formed on the electrode current collector 31 by the distance between the two partition walls 45. An electrode material (moisture powder 20) is supplied between the two partition walls 45 by a feeder (not shown) or the like.

In the roll film forming apparatus 40 according to the present embodiment, a backup roll 43 is arranged as a third rotating roll next to the transfer roll 42. The backup roll 43 serves to convey the electrode current collector 31 to the transfer roll 42. The transfer roll 42 and the backup roll 43 rotate in opposite directions as shown by the arrows in FIG. 5.

The supply roll 41, the transfer roll 42, and the backup roll 43 are connected to respective mutually independent drive devices (motors) (not shown), and the rotation speeds of the supply roll 41, the transfer roll 42, and the backup roll 43 are gradually increased in this order thereby making it possible to convey the moisture powder 20 along the transfer roll 42, and to transfer the moisture powder as the electrode active material layer 32 from the outer peripheral surface of the transfer roll 42 onto the surface of the electrode current collector 31 conveyed by the backup roll 43.

Although not particularly limited, the size (width) of each gap between the supply roll 41, the transfer roll 42, and the backup roll 43 may be set so that the average film thickness of the electrode active material layer 32 at the time of film formation is 10 μm or more and 300 μm or less (for example, 20 μm or more and 150 μm or less).

The sizes of the supply roll 41, the transfer roll 42, and the backup roll 43 are not particularly limited and may be the same as those of the conventional roll film forming apparatus, for example, each roll may have a diameter of 50 mm to 500 mm. The diameters of the supply roll 41, the transfer roll 42, and the backup roll 43 may be the same or different. Further, the width for forming the electrode active material layer 32 may be the same as that of the conventional roll film forming apparatus, and can be determined, as appropriate, depending on the width of the electrode current collector 31 on which the electrode active material layer 32 is to be formed. The material of the outer peripheral surfaces of the supply roll 41, the transfer roll 42, and the backup roll 43 may be the same as the material of the rotating rolls in the conventional known roll film forming apparatus, and examples thereof include SUS steel and SUJ steel.

In FIG. 5, the supply roll 41, the transfer roll 42, and the backup roll 43 are arranged so that the respective rotation axes thereof are arranged horizontally, but this arrangement of the rolls is not limiting.

In the electrode formation step S120 disclosed herein, first, the moisture powder 20 is supplied between the pair of supply rolls 41 and the transfer rolls 42 that rotate in the opposite directions. The moisture powder 20 is carried into the gap between the pair of rolls by rotating the supply roll 41 and the transfer roll 42 in the opposite directions. Then, the moisture powder 20 passes, while being compressed, through the gap between the supply roll 41 and the transfer roll 42 and is formed into a film to form the electrode active material layer 32. That is, the moisture powder 20 is compressed by the supply roll 41 and the transfer roll 42, so that the particles of the moisture powder 20 are integrated with each other and stretched to form a film-shaped electrode active material layer 32. At this time, the particles of the moisture powder 20 (specifically, the aggregated particles) are not particularly limited, but it is presumed that the particles are bonded by the liquid crosslinking force. Examples of the adhesive force (bonding force) between the particles include a van der Waals force and an electrostatic force in addition to the liquid crosslinking force, but the liquid crosslinking force can exert a relatively large adhesive force. For example, suitable adhesive force is exerted even when the solid content ratio is 70% by mass or more (for example, 70% by mass to 87% by mass). In addition to this, carbon nanotubes 26 are present on the surface of the aggregated particles and enhance the binding force. Therefore, by compressing the moisture powder 20 in the capillary state described above, the film-shaped electrode active material layer 32 can be formed even when the binder resin is substantially not included.

Next, the electrode active material layer 32 is adhered to the transfer roll 42 and conveyed. As described above, since the rotation speed of the transfer roll 42 is set to be higher than that of the supply roll 41, the formed electrode active material layer 32 adheres to the transfer roll 42. The electrode active material layer 32 adhered to the transfer roll 42 is conveyed by the rotation of the transfer roll 42 and transferred onto the electrode current collector 31 supplied by the backup roll 43. At this time, when the electrode active material layer 32 comes into contact with the electrode current collector 31 under a certain pressure, the electrode active material layer 32 is transferred onto the electrode current collector 31. As a result, an electrode in which the electrode active material layer 32 is provided on the electrode current collector 31 can be obtained.

The electrode active material layer composed of a general slurry-shaped electrode material is formed by applying an electrode material prepared in a slurry form with an electrode active material and a binder in a suitable solvent to a current collector, drying, and then pressing. According to this method, migration, which is a phenomenon in which a binder having a small specific gravity segregates toward the surface side, occurs when the slurry-like electrode material coated on the current collector is dried. When such migration occurs, the adhesion between the electrode current collector and the electrode active material layer is lowered, and the active material layer is likely to peel off from the current collector during the manufacturing process or during repeated charging and discharging. Another problem is that the slurry-shaped electrode material has a low solid content ratio (typically 55% or less), and it takes time to remove the solvent by drying or the like, so that that the productivity is lowered. Meanwhile, in the electrode manufacturing method disclosed herein, since a non-aqueous electrolytic solution is used as the liquid component, it is not necessary to remove the liquid component. As a result, the migration does not occur, and a high-quality electrode in which the electrode active material layer does not peel off from the electrode current collector can be manufactured. Further, for the above-mentioned reason, the solvent removal step and the solvent recovery device are unnecessary, and the improvement in productivity is also realized. In addition to this, after the battery is constructed, the density of the solid component (electrode active material) can be increased because the moisture powder that includes substantially no binder resin that can be a resistance component is used and a film is formed while compressing with the roll film forming apparatus. This eliminates the pressing step (step of adjusting the density of the electrode active material layer) that is used in the conventional manufacturing method. Therefore, with the electrode manufacturing method disclosed herein, it is possible to manufacture an electrode having higher quality than the conventional one at a low production cost.

The sheet-shaped electrode thus produced is used as a normal sheet-shaped positive electrode or negative electrode of this type for constructing a secondary battery.

Figure 6:
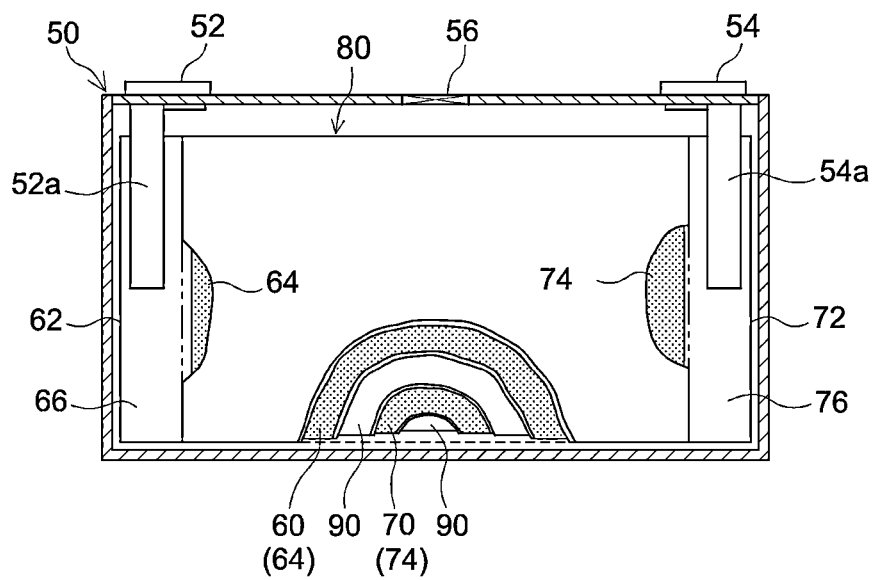
FIG. 6 is an explanatory diagram schematically showing a lithium ion secondary battery according to an embodiment.

The lithium ion secondary battery 100 shown in FIG. 6 is constructed by accommodating a flat wound electrode body 80 and a non-aqueous electrolytic solution (not shown) in a hermetically sealed box-shaped battery case 50. The battery case 50 is provided with a positive electrode terminal 52 and a negative electrode terminal 54 for external connection and a thin-walled safety valve 56 set to release an internal pressure when the internal pressure of the battery case 50 rises to or above a predetermined level. Further, the battery case 50 is provided with an injection port (not shown) for injecting a non-aqueous electrolytic solution or a non-aqueous solvent. The positive electrode terminal 52 and a positive electrode current collector plate 52a are electrically connected to each other. The negative electrode terminal 54 and a negative electrode current collector plate 54a are electrically connected to each other.

The wound electrode body 80 typically has a shape obtained by laminating a long sheet-shaped positive electrode (hereinafter referred to as a positive electrode sheet 60) and a long sheet-shaped negative electrode (hereinafter referred to as a negative electrode sheet 70) with a long sheet-shaped separator 90 interposed therebetween, and winding the laminate in the longitudinal direction. The positive electrode sheet 60 has a configuration in which a positive electrode active material layer 64 is formed along the longitudinal direction on one side or both sides of a positive electrode current collector 62. The negative electrode sheet 70 has a structure in which a negative electrode active material layer 74 is formed along the longitudinal direction on one side or both sides of a negative electrode current collector 72. On the edge of the positive electrode current collector 62 on one side in the width direction, a region where the positive electrode active material layer 64 is not formed along the edge and the positive electrode current collector 62 is exposed (that is, a positive electrode active material layer non-formation portion 66) is provided. On the edge portion of the negative electrode current collector 72 on the other side in the width direction, a region where the negative electrode active material layer 74 is not formed along the edge and the negative electrode current collector 72 is exposed (that is, the negative electrode active material layer non-formation portion 76) is provided. The positive electrode current collector plate 52a and the negative electrode current collector plate 54a are joined to the positive electrode active material layer non-formation portion 66 and the negative electrode active material layer non-formation portion 76, respectively.

As the positive electrode (positive electrode sheet 60) and the negative electrode (negative electrode sheet 70), the positive electrode and the negative electrode obtained by the above-mentioned manufacturing method are used. In the positive electrode and negative electrode of this configuration example, the electrode active material layer 32 (positive electrode active material layer 64 and the negative electrode active material layer 74) is formed on both sides of the electrode current collector 31 (positive electrode current collector 62 and the negative electrode current collector 72).

Examples of the separator 90 include a porous sheet (film) composed of a resin such as polyethylene (PE), polypropylene (PP), a polyester, cellulose, a polyamide, and the like. The porous sheet may have a single-layer structure or a laminated structure of two or more layers (for example, a three-layer structure in which PP layers are laminated on both sides of the PE layer). The separator 90 may be provided with a heat resistant layer (HRL).

The lithium ion secondary battery 100 configured as described above can be used for various purposes. Suitable applications include drive power supplies mounted on vehicles such as battery electric vehicles (BEVs), hybrid electric vehicles (HEVs), and plug-in hybrid electric vehicles (PHEVs). The lithium ion secondary battery 100 may also be used in the form of a battery pack in which in which a plurality of the batteries are connected in series and/or in parallel.

Hereinafter, examples relating to the electrodes disclosed herein will be described, but the techniques disclosed herein are not intended to be limited to those shown in such examples.

Example 1

An electrode for a non-aqueous electrolyte secondary battery was produced according to the flow shown in FIG. 1 by using the positive electrode material shown below.

First, a lithium transition metal oxide ($LiNi_{1/3}Co_{1/3}Mn_{1/3}O_2$) having an average particle diameter ($D_{50}$) of 20 μm based on a laser diffraction/scattering method as a positive electrode active material, and carbon nanotubes (CNT) having an oil absorption amount of 280 ml/100 g as a conductive material were prepared. The mass ratio of the positive electrode active material to the CNT was adjusted to be 90:10.

As a non-aqueous electrolytic solution, a solution prepared by dissolving $LiPF_6$ as a support salt at a concentration of 1 mol/L in a mixed solvent including ethylene carbonate (EC), dimethyl carbonate (DMC) and ethylmethyl carbonate (EMC) at volume ratios of 30:40:30 was prepared.

The carbon nanotubes and the non-aqueous electrolytic solution were put into a planetary mixer and mixed to impregnate the carbon nanotubes with the non-aqueous electrolytic solution. At this time, the non-aqueous electrolytic solution was added so that the solid content ratio of the moisture powder was 70% by mass. Then, the positive electrode active material was added and mixed to obtain a wet mixture. The wet mixture was granulated by a roll mill to produce a moisture powder (positive electrode material).

Next, the obtained moisture powder (positive electrode material) was supplied to the roll film forming apparatus, and a positive electrode active material layer was formed on the surface of a long sheet-shaped positive electrode current collector made of a separately prepared aluminum foil. The electrode active material layer composed of the moisture powder was suitably transferred onto an electrode current collector, and no problems such as peeling were observed. As a result, a positive electrode sheet in which a positive electrode active material layer was formed on a sheet-shaped positive electrode current collector was obtained.

Comparative Example 1

For comparison, a positive electrode composed of a positive electrode material using acetylene black as a conductive material was produced. Specifically, a lithium transition metal oxide ($LiNi_{1/3}Co_{1/2}Mn_{1/3}O_2$) having an average particle diameter ($D_{50}$) of 20 μm as determined based on a laser diffraction/scattering method was prepared as a positive electrode active material, and acetylene black (AB) was prepared as a conductive material. The mass ratio of the positive electrode active material to AB was adjusted to be 90:10.

As a non-aqueous electrolytic solution, a solution prepared by dissolving $LiPF_6$ as a support salt at a concentration of 1 mol/L in a mixed solvent including ethylene carbonate (EC), dimethyl carbonate (DMC) and ethylmethyl carbonate (EMC) at volume ratios of 30:40:30 was prepared.

The acetylene black and the non-aqueous electrolytic solution were put into a planetary mixer and mixed to impregnate the acetylene black with the non-aqueous electrolytic solution. At this time, the non-aqueous electrolytic solution was added so that the solid content ratio of the moisture powder was 70% by mass. Then, the positive electrode active material was added and mixed to obtain a wet mixture. The wet mixture was granulated by a roll mill to produce a moisture powder (positive electrode material).

Next, the obtained moisture powder (positive electrode material) was supplied to the film forming apparatus, and an attempt was made to form a positive electrode active material layer on the surface of a long sheet-shaped positive electrode current collector made of a separately prepared aluminum foil. The positive electrode active material layer could not be formed on the positive electrode current collector.

It follows from the above that with the electrode manufacturing method disclosed herein, a moisture powder formed by aggregated particles including at least an electrode active material, carbon nanotubes, and a non-aqueous electrolytic solution is granulated, and an electrode active material layer composed of the moisture powder is supplied onto an electrode current collector to form an electrode, thereby making it possible to realize the low-cost manufacture of an electrode that includes substantially no binder resin and has an improved electrode density.

The specific examples of the present disclosure have been described in detail above, but these are merely examples and do not limit the scope of claims. The techniques set forth in the claims are inclusive of various changes and modifications of the specific examples illustrated above.

What is claimed is:

1. A method for manufacturing an electrode having either positive or negative electrode current collector and an electrode active material layer for a non-aqueous electrolyte secondary battery, the method comprising:
   a step of preparing an electrode active material, carbon nanotubes as a conductive material, and a non-aqueous electrolytic solution, wherein electrode active material, carbon nanotubes, and the non-aqueous electrolytic solution are prepared separately;
   a step of first mixing the carbon nanotubes and the non-aqueous electrolytic solution to impregnate the carbon nanotubes with the non-aqueous electrolytic solution in the absence of the electrode active material;
   a step of second mixing the carbon nanotubes impregnated with the non-aqueous electrolytic solution and the electrode active material; and
   a step of compressing the mixture obtained by the first mixing step and the second mixing step, wherein the compressing granulates a moisture powder formed by aggregated particles including at least the electrode active material, carbon nanotubes, and the non-aqueous electrolytic solution, and
   a step of forming an electrode by supplying an electrode active material layer composed of the granulated moisture powder onto the electrode current collector.

2. The method for manufacturing an electrode according to claim 1, wherein
   in the moisture powder granulated in the granulation step, a solid phase and a liquid phase form a capillary state in the aggregated particle, and
   a solid content ratio is 70% by mass or more when the total amount of the moisture powder is 100% by mass.

3. The method for manufacturing an electrode according to claim 1, wherein an oil absorption amount of the carbon nanotubes is 280 mL/100 g or more and 1000 mL/100 g or less.

4. The method for manufacturing an electrode according to claim 1, wherein in the electrode formation step, the electrode is formed by adhering the moisture powder supplied between a first roll and a second roll disposed opposite to the first roll as the electrode active material layer onto the outer peripheral surface of the second roll, and transferring the electrode active material layer from the outer peripheral surface of the second roll to the surface of the electrode current collector separately supplied to the second roll.

5. The method for manufacturing an electrode according to claim 1, wherein an average length of the carbon nanotubes is 5 microns (μm) or more and 150 μm or less.

6. The method for manufacturing an electrode according to claim 1, wherein an average diameter of the carbon nanotubes is 2 nanometers (nm) or more and 150 nm or less.

7. The method for manufacturing an electrode according to claim 1, wherein the electrode is a positive electrode.

8. The method for manufacturing an electrode according to claim 1, wherein a support salt concentration in the non-aqueous electrolytic solution in the first mixing step is 2 mol/L or more and 5 mol/L or less.

* * * * *